Nov. 27, 1956  R. CEFALY  2,771,947
CUTTING STICK AND METHOD OF CUTTING PAPER USING SAME
Filed Dec. 28, 1954  2 Sheets-Sheet 1
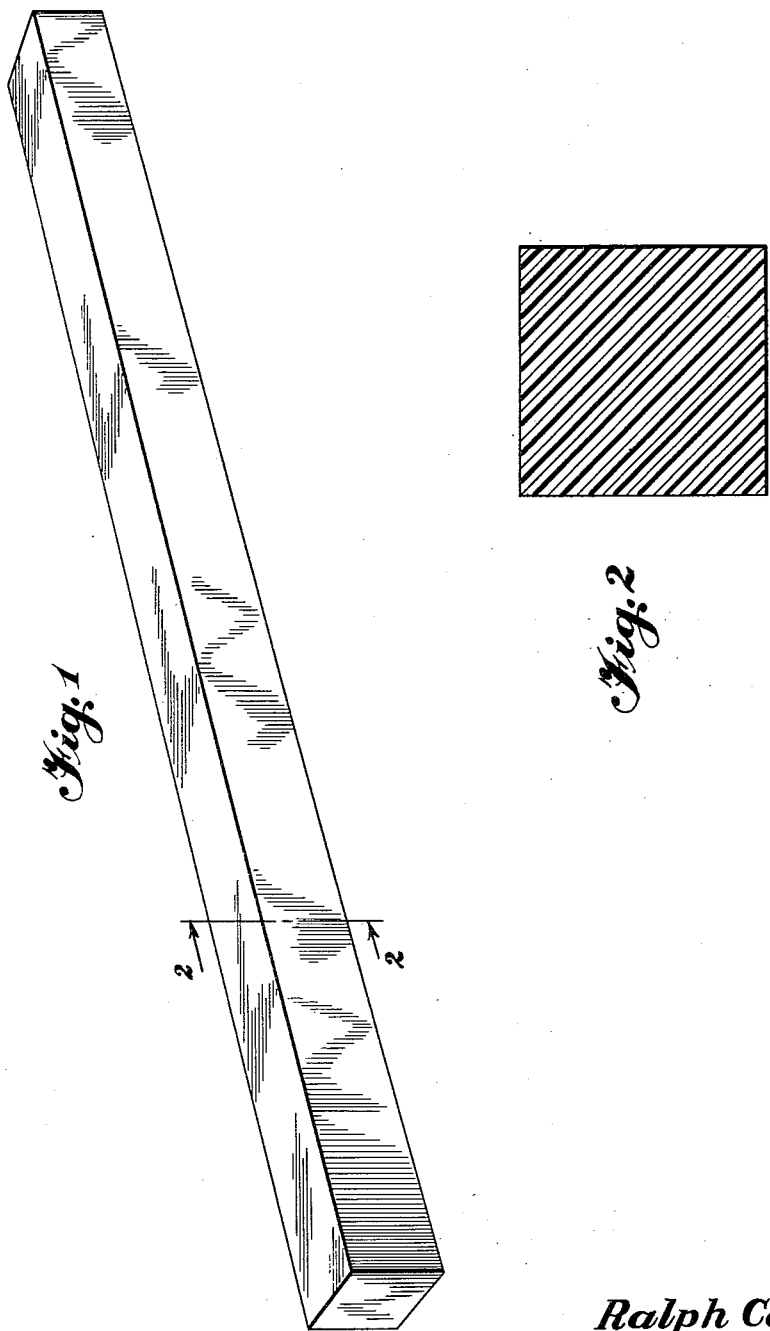
INVENTOR
*Ralph Cefaly*
BY *Beale and Jones*
ATTORNEYS Nov. 27, 1956 R. CEFALY 2,771,947
CUTTING STICK AND METHOD OF CUTTING PAPER USING SAME
Filed Dec. 28, 1954 2 Sheets-Sheet 2

INVENTOR
Ralph Cefaly
BY Beale and Jones
ATTORNEYS

United States Patent Office 2,771,947
Patented Nov. 27, 1956

2,771,947

CUTTING STICK AND METHOD OF CUTTING PAPER USING SAME

Ralph Cefaly, Brentwood, Md.

Application December 28, 1954, Serial No. 478,295

6 Claims. (Cl. 164—17)

This invention relates to cutting sticks for use in conventional sheet cutting machines; and, more particularly, to cutting sticks formed from homopolymers of ethylene which alone or in admixture have a high density, high stiffness, and a low melt viscosity.

The conventional form of cutting stick comprises merely an elongated block of wood or fiber board having a square cross-section. Articles of this type to which this invention relates are generally shown in Patent No. 2,532,672 granted to S. L. Michael et al., December 5, 1950, and Patent No. 2,680,484 granted to H. D. Stuck, June 8, 1954. As is shown in these patents, it is customary to provide a groove in the bed of the cutting machine below the cutting knife. The groove is adapted to receive the cutting stick and retain it firmly therein while the cutting machine is in use. The cutting stick serves as a support for the sheet material which is to be cut and the cutting knife, which is mounted above the bed, is adapted to descend either vertically or at an angle to shear the sheet material. The descent of the cutting knife is arrested by the cutting stick as the cutting edge of the knife passes through the lowermost sheet of material overlying the cutting stick.

The art has long recognized the disadvantages of cutting sticks formed of wood; such as, for example, seasoned hard maple wood. A cutting stick formed of hard maple wood will remain serviceable only for a short period of time even when the stick is turned end for end and side for side in the groove to present unused faces to the edge of the cutting knife. Experience has shown that a hard wood cutting stick must be discarded after approximately 4000 pounds of magazine paper have been cut in the machine in which the stick is employed. In addition to being brittle and rather easily splintered, cutting sticks formed of hard woods have a further disadvantage. Such wooden cutting sticks have an exceptionally hard grained structure distributed throughout the softer portion which will either chip the portions of the edge of the knife coming into contact with the hard grain or will cause those portions of the knife edge to become dull.

The foregoing disadvantages of hard wood cutting sticks have led the art to investigate the use of other types of material in place of hard woods or fiber board. Thus, attempts have been made to produce cutting sticks formed of various synthetic resinous compositions; such as, for example, phenol-formaldehyde molding compositions, rubber compositions, and molding compositions containig copolymers of styrene, acrylonitrile and butadiene. It has been found that, in order to provide a body having good impact strength, it is usually necessary to include fillers and pigments in compositions of the foregoing types. The fillers and pigments are usually harsh and abrasive-like in character with the result that the edge of the cutting knife becomes dull very rapidly when it strikes the cutting stick. These cutting sticks also react very unfavorably when sheared by the cutting knife. The cuts produced in such cutting sticks by the shearing action of the knife are uneven; and, as a result, the cutting knife is unable to shear the lowermost sheets of material evenly in subsequent descents. These cuts or troughs formed in the cutting stick by the knife become enlarged as the cutting machine is used and a proper shearing action between the cutting stick and the cutting knife cannot be obtained which also produces raw edges on the cut sheet material. A still further disadvantage of cutting sticks formed from synthetic resinous compositions of the above-described type is that small fragments of the edge of the cutting knife become lodged in the cutting stick and these cause further damage to the cutting edge of the knife as the machine is used. The latter disadvantage is also found in cutting sticks formed from soft metals; such as, for example, aluminum.

The object of this invention is to provide an improved cutting stick having longer life than any cutting stick heretofore used and which does not require resurfacing or frequent replacement. Another object of this invention is to provide a cutting stick which, when sheared by the cutting knife, will form troughs or cuts that are even throughout the extent thereof and do not become enlarged as the cutting machine is used. Still another object of this invention is to provide a cutting stick which, when sheared by the cutting knife, will form cuts or troughs that tend to recover or close after the cutting knife is withdrawn. A further object of this invention is to provide a cutting stick which does not cause the cutting knife to dull rapidly, and which does not chip the edge of the knife nor remove and retain metal fragments from the edge of the cutting knife. A still further object of this invention is to provide a cutting stick which is free from harsh abrasive-like fillers and pigments that cause the cutting knife to become dully very rapidly.

The foregoing objects are accomplished by this invention which will be fully apparent from the following description and accompanying drawings wherein:

Figure 1 is a perspective view of the cutting sticks embodying the features of this invention;

Figure 2 is a cross sectional view taken along line 2—2 of Figure 1;

Figure 3:
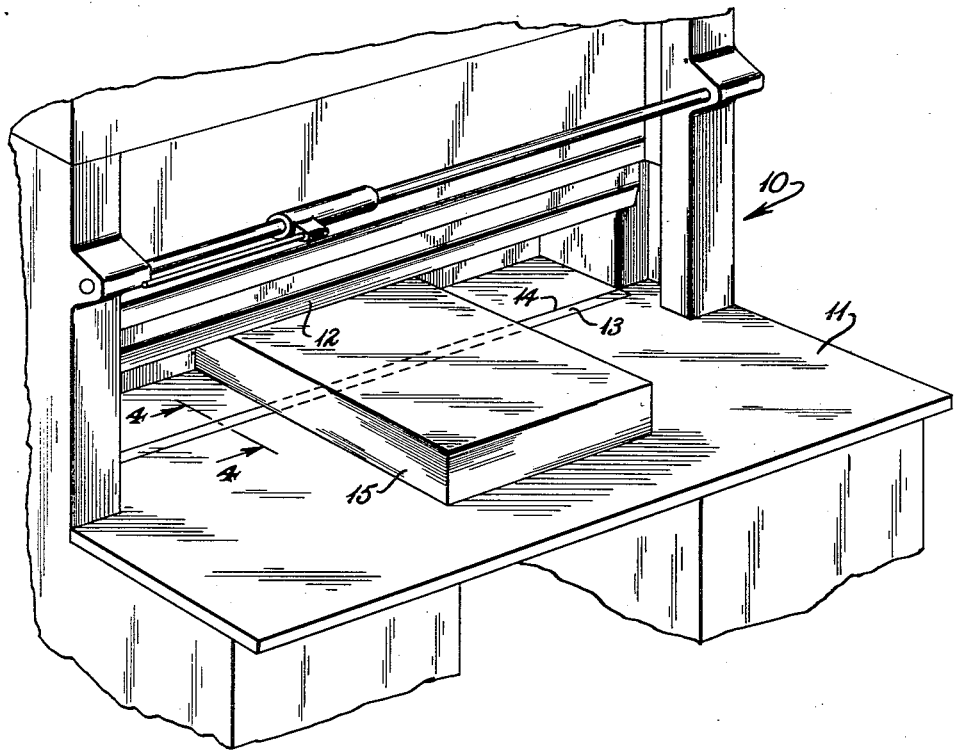
Figure 3 is a fragmentary perspective view of a cutter with the cutting stick in position in the bed and a stack of paper in position for cutting.
Figure 4:
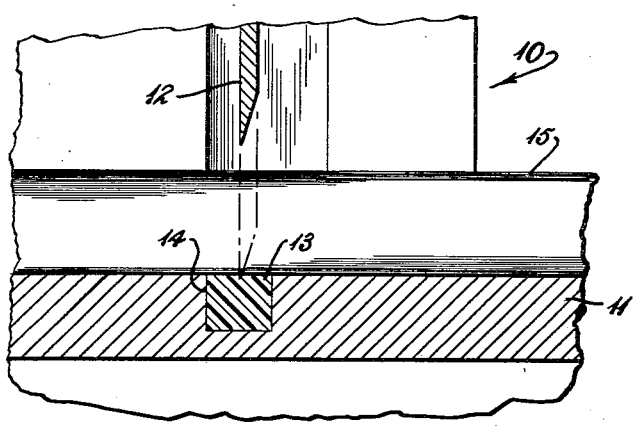
Figure 4 is an enlarged cross sectional view along line 4—4 of Figure 3 showing the cutting stick in the bed, a stack of paper and a cutting knife.

A cutting machine for paper and the like is generally indicated at 10. The cutting machine has the usual bed platform 11 to receive the material to be cut such as the stack of paper 15. The cutter has a reciprocatingly mounted knife 12 which cooperates with the cutting stick 13 mounted in a recess 14 in the bed 11 as best shown in Figure 4.

The foregoing objects are accomplished by this invention which consists of providing a cutting stick formed from ethylene polymers possessing crystallinity induced by short chain branching. These polymers are characterized more specifically by their high density, high stiffness and low melt viscosity.

This invention is based on the discovery that greatly improved cutting sticks may be made from certain homopolymers of ethylene. Polyethylene resins have been available commercially for a number of years. These resins were usually produced by charging ethylene into a reaction vessel wherein the ethylene was processed in the presence of water, and an inert organic solvent such as benzene or tertiary butanol; however, such solvents were omitted in some instances. The reaction was catalyzed with one of a number of well-known ethylene polymerization catalysts; such as, for example, benzoyl peroxide, diethyl peroxide and diethyl peroxydicarbonate. The reaction was carried out under pressures of from 1000 to 2000 atmospheres and temperatures of from about 140° C. to 200° C. The product was continuously discharged from the reaction vessel into an atmospheric pressure separator and the solid and liquid products were periodically removed therefrom by means of a let-down valve located between the vessel and the separator.

For some years it was thought that stiffer polyethylene resins for molding purposes could be obtained either by using a high molecular weight resin or by incorporating suitable fillers with such resins. More recently it has been found, contrary to the foregoing belief, that ethylene polymers increase in stiffness, not with increasing molecular weight, but rather with increasing chain linearity. Thus, it has been discovered [1] that ethylene polymers, instead of being simple linear hydrocarbons such as are produced in vinyl polymerizations, undergo a side reaction in their formation which introduces chain branching into the structure in varying degrees. It is now known that ethylene polymers with less chain branching have a lower amorphous content and higher crystallinity, and that the amorphous content which, in turn reflects the degree of chain branching, may be measured by precise density determinations, among other means. The stiffness and yield point of a polyethylene resin are independent, within wide limits, of its molecular weight as measured by viscosity methods but, instead depend almost entirely upon its linearity or short chain branching which is measurable by infra-red spectroscopy or by density determinations.[2] The use of density as a method of measuring chain branching is ordinarily employed because of convenience and the high degree of precision of this method. An appreciation of the foregoing factors has made it possible to control the linearity of polyethylene resins independently of the molecular weight in polymerizing such resins.

The homopolymers of ethylene employed in forming the improved cutting sticks of this invention are obtained preferably, by controlled polymerization of ethylene and are characterized by their high density, high stiffness and relatively low melt viscosity. The polyethylene resins employed in the preferred embodiment of this invention have a density of from about 0.925 to 0.950 at 23° C. in grams per milliliter, a stiffness above about 25,000 pounds per square inch at 73° F. (Tinius-Olsen, ASTM D747–50), and a melt viscosity, expressed as log viscosity, from about 6 to 9. The log viscosity in this range is defined as the $\log_{10}$ of the melt viscosity at 190° C. in centipoises. The preferred polyethylene resin employed in this invention has a density of about 0.925, a stiffness of about 27,000 pounds per square inch at 73° F. and a log viscosity of about 6.

The foregoing homopolymers of ethylene employed in the preferred embodiment of this invention may be prepared by polymerizing ethylene in the presence of a chain transfer agent such as cyclohexane which appears to control the chain growth and thus tend to give polymers of high density and high stiffness having, however, a relatively low melt viscosity. The preferred polyethylene resins employed in this invention may be prepared by polymerizing ethylene in the presence of from about 0.05 part by weight of cyclohexane per one hundred (100) parts by weight of ethylene. This polymerization is carried out by charging ethylene into a reaction vessel where it is processed in the presence of water, an inert organic solvent, cyclohexane and an ethylene polymerization catalyst. The reaction is conducted at between about 150° C. and 200° C. and under a pressure of from 1200 to 2000 atmospheres. In this process, about 2.0 to 2.5 parts of water, about 0.10 to 0.15 part of inert organic solvent are employed along with about 300 parts of an ethylene polymerization catalyst per million parts of ethylene. The products of this reaction may be recovered and treated in the manner commonly employed in the art. Specific examples of polyethylene resins prepared by the above described method and which are suitable for the purposes of this invention are given below.

*Example I*

Ethylene is polymerized in a reaction vessel at 170° C. and 1200 atmospheres pressure for six minutes. Benzoyl peroxide is employed as a catalyst in the amount of 300 parts per million parts of ethylene. The reaction is carried out in the presence of 2.3 parts of water, 0.175 part of benzene and 0.025 part of cyclohexane. A polyethylene resin having a density of 0.9242, $\log_{10}$ viscosity at 190° C. of 8.85, a stiffness (Tinius-Olsen) of 30,000 p. s. i., a tensile yield of 1710 p. s. i. and a softening point of 94° C. is obtained

*Example II*

Ethylene is polymerized in the manner disclosed in Example I above with the exception that benzene is used in the amount of 0.15 part and cyclohexane in the amount of 0.05 part is employed. The resin produced by this process is very desirable for the purposes of this invention and has a density of 0.925, a stiffness of 31,000 pounds per square inch, a $\log_{10}$ viscosity of 7.28, a tensile yield strength of 1680 pounds per square inch and a softening point of 96° C.

Numerous other polyethylene resins may be prepared with the method previously described by merely varying the controlling factors discussed and the working examples above are merely exemplary of resins useful in this invention. It is essential only to prepare and employ ethylene polymers having high density, high stiffness and low melt viscosity, each within the ranges thereof disclosed hereinabove. Ethylene polymers or mixtures thereof are especially suitable for use in this invention if the polyethylene of which the cutting stick is composed has the following average values for the properties listed below:

| | |
|---|---|
| Tensile strength at 73° F., p. s. i. (ASTM D412–51T) | 1750 |
| Yield point at 73° F., p. s. i. (ASTM D412–51T) | 1700 |
| Elongation at 73° F., percent (ASTM D412–51T) | 600 |
| Stiffness at 73° F., p. s. i. Tinius-Olsen (ASTM D747–50) | 27,000 |
| Softening point, Vicat _____ ° C.. | 96 |
| Density, 230 C. grams/ml. _____ | 0.92 |
| Melt index (ASTM D1238–52T) _____ | 2.1 |

It has been shown above that the polyethylene resins employed in the preferred embodiment of this invention are produced by controlled polymerization of ethylene in the presence of a chain transfer agent. The improved cutting sticks of this invention may also be formed from a blend of a polymer having low crystallinity and a polymer of very high crystallinity. The blend of such polymers has the properties of a polymer of intermediate crystallinity such as a polymer obtained by direct synthesis. This may be done because short chain branching which is the major controlling factor in the production of the polyethylene resins employed in this invention, need not be distributed evenly within all polymer chains. Instead, an average branching is the effective factor.

The ethylene polymers employer in the preferred embodiment of this invention which are characterized by high density, high stiffness and low melt viscosity may be extruded in the form of stock shapes; such as, for example, elongated bodies which are square in cross-section. These may be cut into the desired length and machined to the dimensions of the groove in the bed of the cutting machine. The polymers may also be obtained in the form of a molding powder which is composed of white, waxy, translucent solid particles in the

---

[1] Bryant, Journal of Polymer Science 2, pp. 547–564 (1947) No. 6; Richards, Institute of Petroleum 34, pp. 237–254 (1948) No. 292.
[2] C. A. Sperati et al., Journal of American Chem. Soc. 75, pp. 6127–6133 (1953).

form of cubes having a dimension of about an eighth inch on a side. This powder may be heated and injection-molded in the manner common in this art to produce the cutting sticks of this invention.

The improved cutting sticks of this invention formed of ethylene polymers having high density, high stiffness and low melt viscosity are superior to any cutting stick heretofore employed in cutting machines. These ethylene polymers have a high impact strength and do not necessitate the use of fillers and pigments which are abrasive in nature and tend to dull the cutting knife. Even though the ethylene polymers employed in this invention have a high impact strength, the cutting sticks formed therefrom do not damage the edge of the cutting knife and do not remove fragments or particles of metal therefrom. When the cutting sticks of this invention are employed in cutting machines metal fragments from the cutting knife do not become lodged in the cutting stick; and, accordingly, the cutting knife will not be damaged by such foreign material as is experienced with cutting sticks formed of synthetic resin compositions or soft metal.

The cutting sticks formed of the preferred ethylene polymers described hereinabove react more favorably than any cutting stick heretofore employed when subjected to the impact and shearing action of the cutting knife. The troughs or cuts formed in the cutting stick of this invention are even and retain their shape as the machine is used. Thus, the grooves so formed retain their original shape for a long period of time and are not enlarged by subsequent shearing cuts of the cutting knife. This is due to good recovery properties of the preferred ethylene polymers employed in this invention which tends to close the cut or trough caused by the shearing action of the cutting knife.

The cutting sticks of this invention may be employed for a period of time over ten times greater than the period of use of a cutting stick composed of hard wood. In one installation in which the cutting sticks of this invention are employed the cutting machines are operated fifteen hours a day on a two-shift basis with a different operator on each shift. The machines in this installation are employed for miscellaneous cutting which includes all types of book, magazine and newsprint paper stock. Under these conditions of operation it was found that the cutting sticks of this invention had a life of thirty-eight days whereas a cutting stick of hard wood had a life of less than a week. In another installation in which the cutting sticks of this invention were employed, the life of the cutting stick was three months when the machines were operated each day on a one-shift basis. It has also been found that the cutting knives on cutting machines in which the cutting stick of this invention are employed require sharpening about fifty percent less often than when hard wood cutting sticks are employed in the same machines under the same operating conditions. Finally, in every instance, it has been found that the quality of the cut in the sheet material sheared in machines employing the cutting sticks of this invention is higher than that obtained when hard wood cutting sticks are employed.

This invention has been described in connection with cutting sticks adapted for use in cutting machines equipped with cutting knives which descend upon the cutting stick. The advantages of this invention may, obviously, be obtained when the preferred ethylene polymers are employed in cutting sticks or blocks adapted for use in any cutting machine employing either cutting knives or dies.

I claim:

1. In a cutting machine having a cutting knife, a cutting bed disposed therebeneath, said knife being movable toward and away from said bed, said bed having holding means for a cutting stick disposed beneath said cutting knife and a cutting stick disposed in said holding means for cooperation with said knife, the improvement wherein said cutting stick is an elongated body having knife engaging surfaces, said body consisting essentially of a material of the nature of ethylene homopolymers characterized by short chain branching in the polymer structure and having a density of from about 0.92 to about 0.95 gram per milliliter, a stiffness above about 25,000 pounds per square inch, and a $\log_{10}$ melt viscosity at 190° C. in centipoises of between about 6 and about 9.

2. In a cutting machine having a cutting knife, a cutting bed disposed therebeneath, said knife being movable toward and away from said bed, said bed having holding means for a cutting stick disposed beneath said cutting knife and a cutting stick disposed in said holding means for cooperation with said knife, the improvement wherein said cutting stick is an elonagted body having knife engaging surfaces, said body consisitng essentially of ethylene homopolymers characterized by short chain branching in the polymer structure and having a density of from about 0.92 to 0.95 gram per milliliter, a stiffness above 25,000 pounds per square inch, and a $\log_{10}$ melt viscosity at 190° C. in centipoises of between about 6 and 9.

3. In a cutting machine having a cutting knife, a cutting bed disposed therebeneath, said knife being movable toward and away from said bed, said bed having holding means for a cutting stick disposed beneath said cutting knife and a cutting stick disposed in said holding means for cooperation with said knife, the improvement wherein said cutting stick is an elongated body having knife engaging surfaces, said body consisting essentially of ethylene homopolymers characterized by short chain branching in the polymer structure and having a density of about 0.925 gram per milliliter, a stiffness of about 27,000 pounds per square inch, and a $\log_{10}$ melt viscosity at 190° C. in centipoises of about 6.

4. In a cutting machine having a cutting knife, a cutting bed disposed therebeneath, said knife being movable toward and away from said bed, said bed having holding means for a cutting stick disposed beneath said cutting knife and a cutting stick disposed in said holding means for cooperation with said knife, the improvement wherein said cutting stick consists of an elongated body having a rectangular cross section providing a plurality of cutting tool engaging surfaces said body consisting essentially of mixture of ethylene homopolymers, a portion of the homopolymers in said mixture being characterized by low crystallinity and the balance of the polymers being characterized by high crystallinity, said mixture of ethylene homopolymers having a density of from about 0.92 to 0.95 gram per milliliter, a stiffness above about 25,000 pounds per square inch and a $\log_{10}$ melt viscosity at 190° C. in centipoises of between about 6 and 9.

5. In a cutting machine having a cutting knife, a cutting bed disposed therebeneath, said knife being movable toward and away from said bed, said bed having holding means for a cutting sitck disposed beneath said cutting knife and a cutting stick disposed in said holding means for cooperation with said knife, the improvement wherein said cutting stick consists of an elongated body having a rectangular cross section providing a plurality of cutting tool engaging surfaces said body consisting essentially of ethylene homopolymers characterized by short chain branching in the polymer structure and having the following average properties:

| | |
|---|---|
| $\log_{10}$ melt viscosity at 190° in centipoises | 6.0 |
| Density at 23° C. in grams per milliter | 0.92 |
| Stiffness at 73° F. in p. s. i. (Tinius-Olsen, ASTM D747–50) | 27,000 |
| Tensile strength at 73° F. in p. s. i. (ASTM D412–51T) | 1,750 |
| Yield point at 73° F. in p. s. i. (ASTM D412–51T) | 1,700 |
| Elongation at 73° F. per cent (ASTM D412–51T) | 600 |

6. The method of cutting paper and paper-like sheets which consists of placing a plurality of said sheets in stacked relation upon a supporting surface, cutting said stacked sheets with a knife in a plane extending transversely of said stacked sheets, supporting said stacked sheets at the base thereof coextensive of the plane in which said sheets are cut with a resilient rigid body consisting essentially of ethylene homopolymers characterized by short chain branching in the polymer structure and having the following average properties:

| | |
|---|---:|
| $\text{Log}_{10}$ melt viscosity at 190° in centipoises | 6.0 |
| Density at 23° C. in grams per milliliter | 0.92 |
| Stiffness at 73° F. in p. s. i. (Tinius-Olsen, ASTM D747–50) | 27,000 |
| Tensile strength at 73° F. in p. s. i. ASTM D412–51T) | 1,750 |
| Yield point at 73° F. in p. s. i. (ASTM D412–51T) | 1,700 |
| Elongation at 73° F. percent (ASTM D412–51T) | 600 | whereby said knife in cutting said body at the same time said stacked sheets are cut forms cuts in said body which close after being cut, said body remaining free of extraneous matter.

References Cited in the file of this patent
UNITED STATES PATENTS

| | | |
|---|---|---|
| 1,999,062 | Sherman | Apr. 23, 1935 |
| 2,586,322 | Franta | Feb. 19, 1952 |